UNITED STATES PATENT OFFICE.

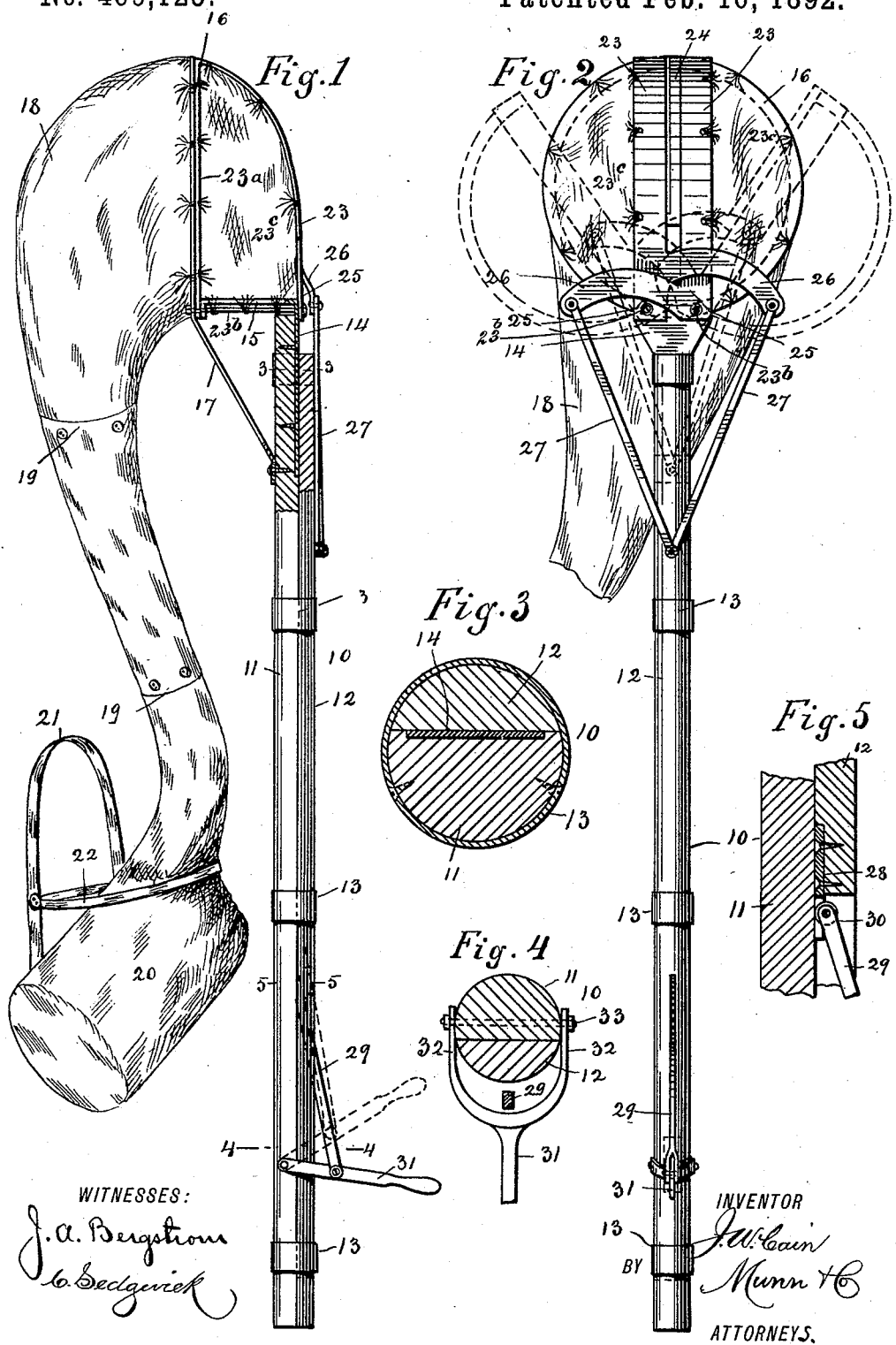

JOHN W. CAIN, OF RUSK, WEST VIRGINIA.

FRUIT-PICKER.

SPECIFICATION forming part of Letters Patent No. 469,125, dated February 16, 1892.

Application filed September 23, 1891. Serial No. 406,549. (No model.)

*To all whom it may concern:*

Be it known that I, JOHN W. CAIN, of Rusk, in the county of Ritchie and State of West Virginia, have invented a new and Improved Fruit-Picker, of which the following is a full, clear, and exact description.

My invention relates to improvements in that class of fruit-pickers which enable a person to stand upon the ground and pick fruit from the tops of the trees; and the object of my invention is to produce a simple, durable, and efficient fruit-picker which may be conveniently operated to pick fruit from the tree-tops and which will deliver the fruit into a sack carried by the operator.

To this end my invention consists in certain features of construction and combinations of parts, which will be hereinafter described and claimed.

Reference is to be had to the accompanying drawings, forming a part of this specification, in which similar figures of reference indicate corresponding parts in all the views.

Figure 1 is a broken side elevation, partly in section, of the fruit-picker embodying my invention. Fig. 2 is a front elevation of the same. Fig. 3 is an enlarged cross-section through the handle on the line 3 3 in Fig. 1. Fig. 4 is an enlarged cross-section through the handle on the line 4 4 in Fig. 1, and Fig. 5 is a broken detail longitudinal section showing the manner in which the connecting-rod is secured to the movable part of the handle.

The device is provided with a two-part handle 10 long enough to reach well into the top of a tree, the handle having one fixed part 11, which forms a little more than half of the handle, and having a movable part 12, held to slide in keepers 13 on the fixed part of the handle, and when the machine is used the operator may grasp one of the keepers, so that his hand will not interfere with the easy working of the machine. A tongue 14 is fixed to the inner flat portion of the part 11 of the handle at its upper end, the tongue projecting above the top of the handle, where it is widened, as best shown in Fig. 2, and it is then bent rearward at a right angle, as shown at 15, to form a support for the ring 16, through which the fruit passes, and which is further supported by a brace 17, extending from the base of the ring to the handle, as shown in Fig. 1. A spout 18 is secured to the ring 16 and extends downward from the handle, being made up in sections buttoned or otherwise secured together, as shown at 19, and the spout terminates at its lower end in a sack 20, which is provided with a shoulder-strap 21, so that it may be conveniently carried by the operator, and it is also provided with a strap 22, which is secured to the strap 21 and serves as a brace.

The machine is provided with two swinging jaws 23, which at their lower front ends are pivoted to the vertical portion of the tongue 14, and the jaws are curved rearward to the top of the ring 16 and are then bent downward, as shown at 23$^a$ in Fig. 1, so as to fit against the ring, the lower rear ends, as well as the front ends, being pivoted on the bolts 23$^b$, which extend transversely through the tongue 14 and a flange at the rear of the horizontal portion 15. One jaw is provided with a knife 24, so that the stems of the fruit may be cut off, if desired; but if the fruit is to be pulled the knife may be dispensed with. Each jaw is provided at its lower end with a laterally-extending arm 26, fixed to the jaw at 25, the arm of one jaw extending in the opposite direction to the arm of the other jaw, and one arm also is arranged inside of the other, so that they may swing freely without clashing. The outer ends of the arms are pivoted to rods 27, which extend downward and inward and are pivoted to the sliding portion 12 of the handle. The jaws are provided with a fabric covering 23$^c$, which is secured to the jaws and to the bolt 23$^b$, the covering serving to prevent the fruit falling out from the sides of the jaws and guiding the fruit into the ring.

Near the lower end of the handle is a plate 28, which is secured to the inner portion of the sliding part 12 of the handle, and a rod 29 is hinged to this plate, as best shown in Fig. 5, and extends outward and downward through a slot 30 and is pivoted to a lever 31, which lever is forked, having arms 32, which embrace the handle, and these arms are pivoted on a pin 33, which extends through the fixed part of the handle. It will thus be seen that by working the lever up and down the plate 28 and movable part 12 of the handle may be correspondingly moved, and the movement will be imparted by means of the rods 27 to the arms 26 and jaws 23, so that the jaws will be also opened or closed.

To operate the machine, the lever 31 is pushed upward, thus opening the jaws 23. The jaws are placed so as to embrace the fruit to be picked, and the lever 31 is then pulled down, thus closing the jaws over the fruit, which is either cut off, as when the jaws are provided with a knife, or is pulled off, and will then roll down through the spout 19 into the sack 20.

If desired, the operator may carry a socket to hold the lower end of the handle 10, the socket being supported on a body-strap.

Having thus described my invention, I claim as new and desire to secure by Letters Patent—

1. A fruit-picker comprising a two-part handle, one part being held to slide on the other, a lever pivoted to the fixed portion of the handle, a tongue secured to the fixed portion of the handle and doubled over the handle-top so as to extend laterally therefrom, a ring secured to the outer end of the tongue and connected by a brace with the handle, swinging jaws pivoted on the tongue and having their upper ends curved rearward to a point adjacent to the ring, said jaws having laterally-extending arms at their lower ends, rods connecting the jaw-arms with the movable part of the handle, and a spout secured to the ring and extending downward to a receiving-sack, substantially as described.

2. A fruit-picker comprising a two-part handle, one part being held to slide on the other, a lever pivoted on the fixed portion of the handle and connected pivotally with the sliding part thereof, a tongue secured to the top of the handle and extending laterally therefrom, a ring supported on the tongue, a spout secured to the ring and extending downward, where it terminates in a receiving-sack, a pair of swinging jaws pivoted on the tongue and curved rearward toward the ring, said jaws having a suitable covering extending from their backs to the ring, laterally-extending arms secured to the jaws near their pivots, and rods connecting the arms with the movable part of the handle, substantially as described.

JOHN W. CAIN.

Witnesses:
JOHN B. LEMMON,
W. H. RUTHERFORD.